March 15, 1938. A. P. DE SEVERSKY 2,111,530
LIFT INTENSIFIER FOR AIRCRAFT
Filed June 29, 1935 2 Sheets-Sheet 1
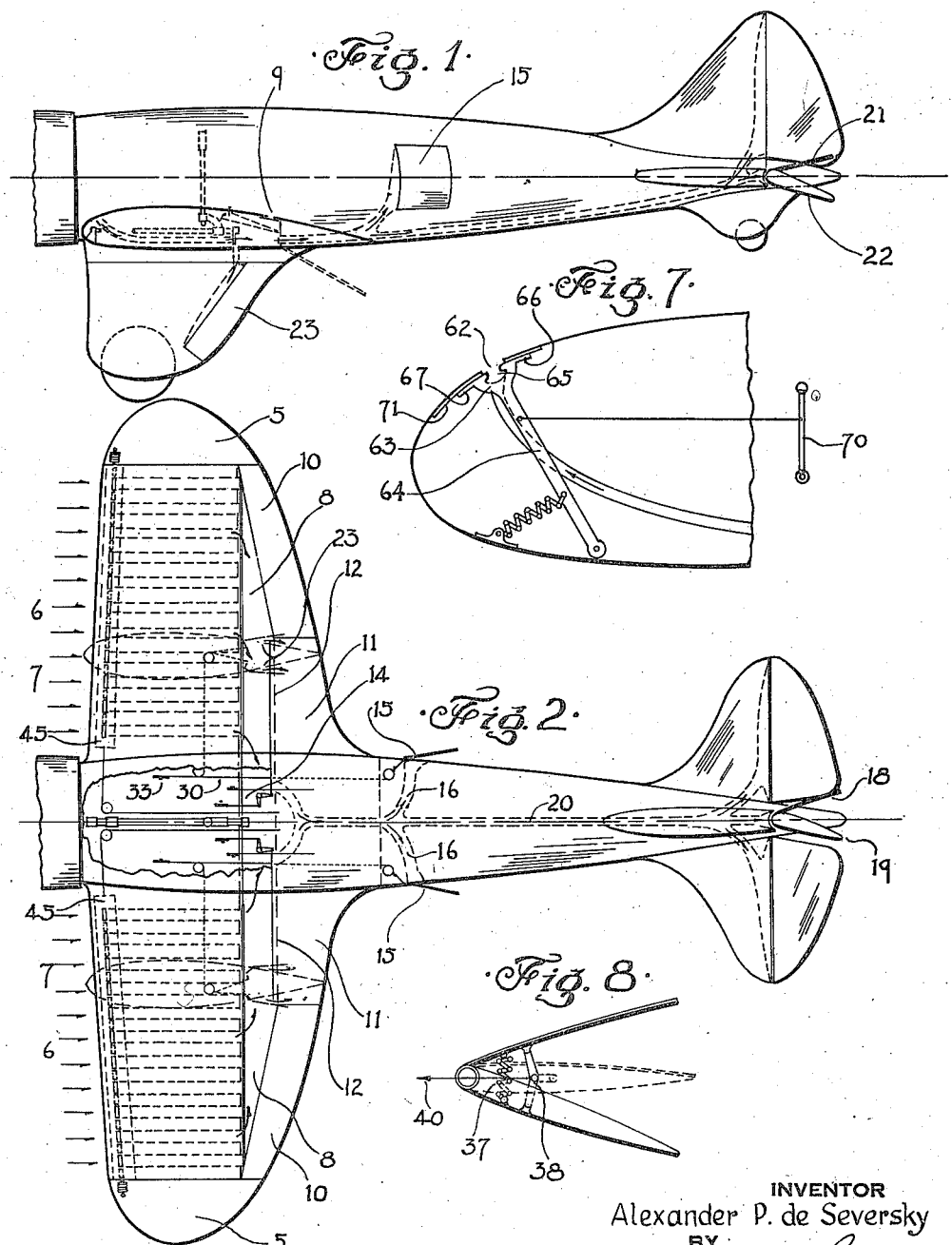
INVENTOR
Alexander P. de Seversky
BY
Hammond & Littell
ATTORNEYS March 15, 1938. A. P. DE SEVERSKY 2,111,530
LIFT INTENSIFIER FOR AIRCRAFT
Filed June 29, 1935  2 Sheets-Sheet 2
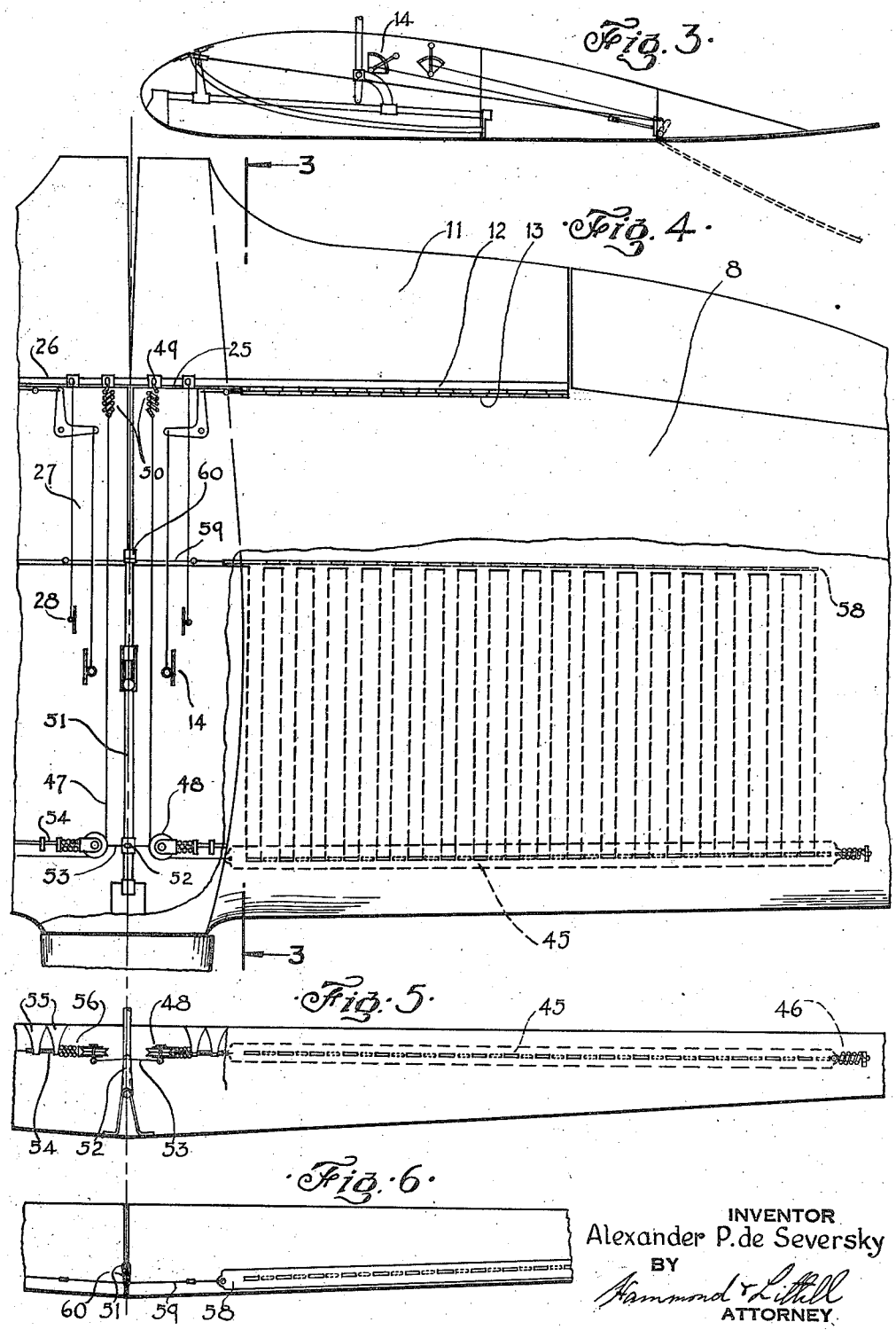
INVENTOR
Alexander P. de Seversky
BY
ATTORNEY Patented Mar. 15, 1938

2,111,530

UNITED STATES PATENT OFFICE 2,111,530

LIFT INTENSIFIER FOR AIRCRAFT

Alexander P. de Seversky, New York, N. Y.

Application June 29, 1935, Serial No. 29,124

4 Claims. (Cl. 244—42)

The present invention relates to aircraft and has for an object to make improved provision for intensifying the lift of the wings when flying at low speed, especially under the conditions of landing.

The invention aims also to provide an arrangement for intensifying at will the lift of one wing more than the other as a means for maintaining lateral stability and keeping the craft on an even keel.

One of the problems involved in the use of aeroplanes, particularly high speed aeroplanes is concerned with landing. For obvious reasons it is desirable to be able to land an aeroplane while flying at as low a speed as possible but there is the serious difficulty that if the pilot attempts to reduce the speed of the craft below a certain minimum, depending upon the design and size of the wings as compared with the weight of the craft, the lift of the wings is insufficient to prevent crashing. Within certain limits the lift of the wings can be increased by increasing the angle of attack, but when the angle exceeds a certain limit depending upon the design, the lift of the wing decreases very rapidly due to turbulence of the air above the wing. This angle varies from 12 to 20 degrees, depending upon whether or not the flap is used and on what type of airfoil is used. The turbulence can be reduced by providing means for creating suction at properly selected points on the upper surface of the wings. The present invention provides an effective arrangement for taking advantage of this possibility. To this end means are provided for creating suction by the use of the momentum of the craft in a way to retard the flight as well as to provide the suction desired.

The invention has been developed in connection with the design of a monoplane and for convenience such a plane will be described but it will be understood that the particular construction is illustrative merely.

The invention will be better understood from a consideration of a particular illustrative embodiment for the purpose of which description reference should be had to the accompanying diagrammatic drawings forming a part hereof and in which—

Figure 1 is a side view of a monoplane embodying the invention,

Fig 2 is a plan view of the same,

Fig. 3 is a detail sectional view taken on the line 3—3 of Fig. 4,

Fig. 4 is a detail plan view showing the arrangement of the suction ports and the mechanism for closing the same and for controlling the suction producing devices, Fig. 5 is a front view of certain parts shown in Fig. 4, Fig. 6 is a diagrammatic detail view showing the air control valve 58, Fig. 7 is a diagrammatic view showing a second form of valve for controlling the suction ports, and Fig. 8 is a detail view showing the arrangement for controlling the suction at the rudder.

In the structure shown for the purpose of illustrating the principles of the invention each wing 5 of the craft is provided with a series of suction ports 6 along its upper surface relatively close to the forward edge. The position of these ports is selected in accordance with the design of the wing and the speed of the plane upon landing and also according to the angle of attack of the wing at the time of landing the craft, the position being so selected that suction through the ports will have the maximum possible influence in causing a streamline flow of air over and along the top of the wing when landing at low speed. These ports are connected by conduits 7 with suction chambers 8 which may suitably be provided in the body of the wing structure as indicated in Fig. 2. A second series of ports as shown at 9 may also be provided. These are arranged for separate manual control. The suction chambers of the two wings are preferably but not necessarily separated from each other, but if the wings are well built and not subject to unusual stresses, it is not necessary to sub-divide each chamber into sections.

In order to produce the desired suction in the suction chambers 8 there are, as shown, a number of suction producing devices some or all of which may be rendered operative by the pilot at will.

The usual ailerons 10 are provided at the rear edges of the wings toward their outer ends, and centrally of the craft, and between the ailerons suction creating devices are provided. These comprise pivoted gates or flaps 11 which move downward to form a suction device for the purpose of creating suction as the craft flies through the air. Each gate forms a portion of the rear lower wing surface and may be moved downward about its pivot either a slight amount to provide suction only or through a greater angle to increase the lift or to act as a brake. The rear walls of the chambers 8 are apertured as indicated at 12 to provide connections with the suction devices in the wings. These ports may be closed by slide valves 13 which for simplicity of disclosure are shown as manually, rather than automatically controlled, as by levers 14 with bell-crank and link connections. These valves 13 make possible the closing of the ports 12, if the suction behind the flaps 11 when operating as a brake ceases to be effective.

As shown the two flaps 11 are formed as separate members capable of being operated independently of each other. In flight when a flap 11 is moved downwardly an opening is formed between it and the upper part of the wing, thereby creating a suction which through the suction chamber 8 and the passages 7 causes suction at the ports 6. It is to be noted that suction is created immediately upon the opening of the flaps 11 whether or not they are moved downwardly to a sufficient extent to either increase the lift of the wing or to act as a brake to slow the speed of the craft.

It is particularly to be noted that the wings of the craft shown are positioned so that the lower surface of the wings is either flush with or lies below the level of the underside of the fuselage. This makes it possible to extend each flap 11 to the center of the craft and to provide a flap of considerable area. There is, furthermore, the advantage that it is quite feasible to extend the flaps rearwardly to a point substantially back of the rear edge of the body of the wing. This structure offers the further advantage that when the flap is swung down at a considerable angle, thereby to increase the lift and serve as a brake the additional area due to the position of the wing relative to the bottom of the fuselage increases the effect.

Other suction devices are shown as provided on the fuselage, on the rudder and elevators, and even on the wheel housings.

On the fuselage side doors 15 are provided which may be opened to induce suction. The suction spaces within these doors are connected by suitable passages 16 with the suction chambers 8 on the two sides of the craft. The passages may afford either one unitary connection to both ports as shown or separate connections with the two. The rear portion of the rudder is provided with gates 18, 19 which may be swung outwardly from each other to provide suction. The passages 20 and 16 serve to connect this source of suction with the chambers 8. The elevators are also provided with similar gates as indicated at 21 and 22, Fig. 1, whereby further suction producing devices are made operative at the will of the pilot. Suction producing gates 23 are also shown at the rear portion of the landing gear housings.

The suction producing flaps or gates and the valves which control flow through the ports 6 may be operated by any suitable controls connected as may be convenient for the pilot. In the construction diagrammatically illustrated they are arranged to be operated by several separate control levers rather than by one unit control. The flaps 11 are connected to be moved by one rock shaft 25 which is connected through an arm 26 and link 27 to an operating lever 28. Flaps 15 on the fuselage, and flaps 23 on the landing gear housings may be opened by wires 30 from arms 31 and 32 secured to the flaps which wires pass over suitably placed sheaves and are connected to an operating lever 33. These flaps may be closed by springs 34 and 35 against the tension of which they are opened.

Operating devices for the suction flaps on the rudder and elevators must operate without interfering with the normal operation of these parts. Any convenient devices may be used. For the purposes of illustration there are shown in Fig. 8, a spring 37 tensioned to draw the two rudder flaps together and a pair of toggle links 38 operated by a tension wire 40 for separating them. The wire 40 is guided over suitable sheaves 41 to the operating lever 33. The arrangements for operating the elevator flaps are similar and their operating wire 43 is guided over suitably placed sheaves and connected to the operating wire 40.

The several suction devices when operating cause suction to be maintained in the suction chambers 8. It is then necessary that the suction ports 6 be open but otherwise during flight these ports should be closed to reduce resistance. Accordingly the ports are controlled by suitable valves, slide valves 45 being illustrated in Figs. 2 to 5. Springs 46 are tensioned to close the valves and wires 47 passing over sheaves 48 and connected to arms 49 on the rock shaft 25 open the valves when the flaps 11 are opened. Springs 50 inserted between the wires 47 and the arms 49 permit the necessary further movement of the rock shaft beyond the position at which the slide valves are fully open. This is preferred to a cam arrangement giving the same relative movements.

The intensifying of the lift of the wings by suction applied as indicated may be used as a means for aiding in maintaining the craft on an even keel by opening the suction port controlling valve on one wing and closing or partially closing that on the other wing. As an illustrative arrangement for this purpose the sheaves 48 are shown as movable laterally of the craft under control of the stick. As shown a shaft 51 extending longitudinally is rocked by the stick and an arm 52 on this shaft is connected by links 53 with the sheaves. Slides 54 movable in brackets 55 and normally urged toward innermost central position by springs 56 support the sheaves for movement under control of the stick as outlined.

A more satisfactory control for lateral stabilization of the craft can be obtained by adding valves for controlling the suction through the passages leading to the ports 6, such additional valves being designed primarily to give the control desired for this purpose, whereas the valves controlling ports 6 are designed primarily to give the control desired for slow landing speeds. The valves provided for this purpose are indicated at 58 and are slide valves connected by links 59 to an arm 60 on the rock shaft 51.

Ordinarily in the course of flight the stick will not be moved laterally beyond a certain usual position and in the arrangement shown the valves 45, although connected to be operated by the stick, are not operated as long as the movement of the stick is within the usual limits.

In Fig. 7 another form of valve for controlling the suction ports of the wings is shown. In this arrangement the ports 62 are closed by valves 63 carried by a rock shaft 64. The valves have central ports 65 smaller than the ports 62 with port closing elements 66 and 67 at either side thereof. The effective port opening when small, as the valves move from their lowermost position, is relatively far forward but moves backward as the opening is increased and, furthermore, can be shifted rearwardly by further movement of the rock shaft because the port of the valve is smaller than the port in the wing sheathing. This makes possible the shifting of the effective port opening to the position of maximum effect which position may vary as the angle of attack of the wing varies. The rock shaft 64 and valves 63 are operated by a hand lever 70.

Since the wing surface is not arcuate a frame 71 having an arcuate inner face and an outer face corresponding to the shape of the wing is provided. This has certain advantages over a flexible sliding valve fitting against the upper wing sheathing.

I claim:—

1. An aircraft having streamline wings, adjustable ports along the tops of the wings near their forward edges, and means for opening said ports and for shifting the port openings toward or from the edges of the wings.

2. An aircraft having a streamline fuselage, streamline wings and streamline control surfaces, inlet ports along the upper surfaces of said wings relatively close to the leading edges thereof; conduits connected to said ports; and means for causing suction in said conduits comprising flaps forming the rear lower surfaces of said wings and movable downward to increase the camber and to form suction openings, flaps on said fuselage movable outward at their trailing edges from said fuselage to form suction openings and flaps on said control surfaces movable to form suction openings at their trailing edges.

3. An aircraft having streamline wings with a fixed rigid sheathing having ports in its upper surface relatively close to the leading edge, a port closing gate movable along the inner surface of the sheathing to open and close said ports from within the wings, flaps forming a portion of the streamline wings when in uppermost position and movable downward to increase the camber of the lower wing surface and to provide suction openings arranged to be opened and closed by said flaps and conduits connecting such suction openings and ports and operating means for said flaps and gate.

4. An aircraft as defined in claim 3 wherein the suction producing flaps extend beneath the fuselage and have portions extending rearwardly from the body of the flaps beneath the fuselage to provide a greater width of flap at this section of the wing.

ALEXANDER P. DE SEVERSKY.